United States Patent
Milli

(10) Patent No.: US 9,266,128 B2
(45) Date of Patent: *Feb. 23, 2016

(54) METHOD AND APPARATUS FOR ELECTROSTATIC PAINTING

(71) Applicant: EUROSIDER S.A.S. di Milli Ottavio & C., Grosseto (IT)

(72) Inventor: Ottavio Milli, Grosseto (IT)

(73) Assignee: EUROSIDER S.A.S.di Milli Ottavio & C., Grosseto (IT)

( * ) Notice: Subject to any disclaimer, the term of this patent is extended or adjusted under 35 U.S.C. 154(b) by 76 days.

This patent is subject to a terminal disclaimer.

(21) Appl. No.: 13/869,175

(22) Filed: Apr. 24, 2013

(65) Prior Publication Data

US 2014/0099448 A1 Apr. 10, 2014

(30) Foreign Application Priority Data

Oct. 10, 2012 (IT) .................................. FI2012A0205

(51) Int. Cl.
| | |
|---|---|
| *B05B 5/00* | (2006.01) |
| *B05B 5/03* | (2006.01) |
| *B05B 5/16* | (2006.01) |
| *B05B 15/12* | (2006.01) |

(52) U.S. Cl.
CPC ................. *B05B 5/001* (2013.01); *B05B 5/032* (2013.01); *B05B 5/1683* (2013.01); *B05B 15/1229* (2013.01)

(58) Field of Classification Search
CPC ........ B05B 5/001; B05B 5/16; B05B 5/1683; B05B 5/032
USPC ............................................ 427/475; 239/706
See application file for complete search history.

(56) References Cited

U.S. PATENT DOCUMENTS

| | | | | |
|---|---|---|---|---|
| 5,061,510 | A | * | 10/1991 | Nussbaumer et al. ........ 427/478 |
| 2014/0356545 | A1 | * | 12/2014 | Milli .............................. 427/460 |

\* cited by examiner

*Primary Examiner* — Xiao Zhao
(74) *Attorney, Agent, or Firm* — Young & Thompson

(57) ABSTRACT

A device and method for electrostatic powder coating include: obtaining continuously a working fluid constituted by air deprived of undesirable substances; supplying the working fluid, between 0.5 bar and 10 bar, in a container containing an amount of coating powder; extracting from the container; a first flow made up of working fluid and powder; atomizing the first flow with working fluid at a pressure of between 0.5 bar and 10 bar; supplying working fluid at a pressure of between 0.5 bar and 10 bar to create a second transport flow made up of working fluid and atomized powder; charging the second flow electrostatically under pressure; and sending the second electrostatically charged flow of working fluid and atomized powder onto a substrate, at a temperature of between −15° C. and +45° C., and a device and method for electrostatic painting including heating/cooling temperature adjustment of the painting mixture.

20 Claims, 3 Drawing Sheets

METHOD AND APPARATUS FOR ELECTROSTATIC PAINTING

SECTOR OF THE INVENTION

Figure 1:
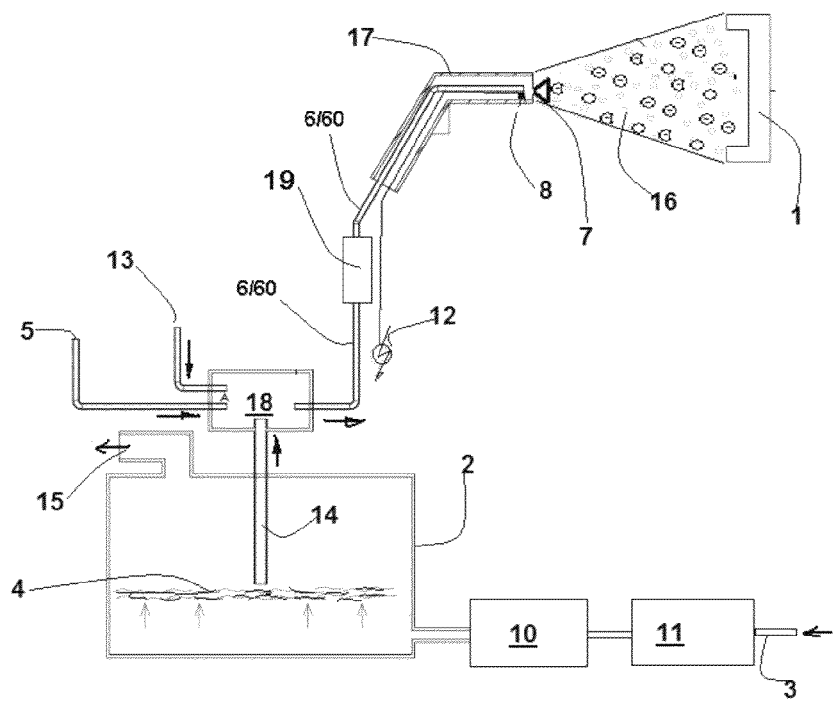

The present invention relates to a method and an apparatus for systems for electrostatic powder coating that exploits the use of a carrier fluid constituted by air deprived of undesirable substances, together with ionization and heat conditioning of said carrier fluid.

In greater detail, the invention relates to a method and an apparatus for coating that uses as paint-carrier fluid a mixture rich in nitrogen/oxygen/argon obtained continuously from compressed air during coating.

PRIOR ART

As is known, the current state of the art in powder-coating systems envisages a corona-effect electrostatic-spray system, where positioned in the terminal part of the guns are one or more needles that yield a charge to the powder to be attracted onto the products to be coated, or else with the system known as "tribo" with which the powder is charged by rubbing in a purposely provided tube.

In either case, the operating coating steps envisage entrainment of the powder, movement of the fluidized bed, atomization/nebulization of the powder, and sending of the electrostatically charged powder onto the substrate to be coated. It is also known that peristaltic recovery of the dispersed powder is commonly obtained with compressed air produced by a normal compressor.

One of the known drawbacks is represented by the fact that the compressed air used entrains along with it elements that are harmful for a perfect, distribution penetration, and flow of the powder over the substrates to be coated, such as, for example, humidity, particles of hydrocarbons due to the compression of the air and particles in suspension present in the atmospheric air.

Even though the coating operation is carried out in purposely designed spray booths or protected environments, the substrates to be coated undergo the effect of the relative humidity of the environment. This problem is much felt in so far as it gives rise to microbubbles that form between the substrate and the film of coating, and over time cracks may arise in the film itself with consequent problems of quality and detachment of the film.

In this connection, it must in fact be recalled that, according to the reference tables of the U.S. International Standard Atmosphere, environmental air is made up as follows:

TABLE A

| Ambient Air Specification (U.S. International Standard Atmosphere) | | | |
|---|---|---|---|
| Substance | Symbol | Value | Unit |
| Nitrogen | $N_2$ | 78.080 | vol. % |
| Oxygen | $O_2$ | 20.944 | vol. % |
| Argon | Ar | 0.934 | vol. % |
| Carbon Dioxide | $CO_2$ | 350/360 | ppmV |
| Neon | Ne | 16.1 | ppmV |
| Helium | He | 4.6 | ppmV |
| Kripton | Kr | 1.08 | ppmV |
| Xenon | Xe | 0.08 | ppmV |
| Methane | $CH_4$ | 2.2 | ppmV |
| Hydrogen | $H_2$ | 0.5 | ppmV |
| Nitrogen Protoxide | $N_2O$ | 0.3 | ppmV |
| Carbon Monoxide | CO | 0.2 | ppmV |

TABLE A-continued

| Ambient Air Specification (U.S. International Standard Atmosphere) | | | |
|---|---|---|---|
| Substance | Symbol | Value | Unit |
| Ozone | $O_3$ | 0.04 | ppmV |
| Ammonia | $NH_3$ | 4 | ppbV |
| Sulphur Dioxide | $SO_x$ | 1.7 | ppbV |
| Nitrogen Oxide | $NO_x$ | 1.5 | ppbV |
| Hydrogen Sulphide | $H_2S$ | 0.05 | ppbV |
| Total Organics (other than Methane) | | <10 | ppmV |
| Other Acid Gases (HCl, etc.) | | <0.1 | ppmV |
| Dust | | 5 | $mg/Nm^3$ |
| Water | $H_2O$ | <65 | $g/Nm^3$ |

From these premises there follow the problems typical of conventional powder coating, which uses air without any treatment as carrier fluid for the steps of management of the powder fluidized bed, entrainment, nebulization, and peristaltic recovery.

The contamination by humidity, the vesicular pollution from the hydrocarbon residue (that is, pollution from the hydrocarbon residue in the form of vesicles), as likewise the oily organic substances, moreover yield as a consequence formation of aggregates and accumulations of powder, difficulty of entrainment thereof in the distribution ducts, and non-homogeneity of nebulization and perfect spreading of the powder and lack of uniformity in the thicknesses with consequent difficulty in flow of the coating.

Furthermore, typical of electrostatic powder coating or liquid coating is the formation, in the corners or at the ends of perforations present in the product to be coated, of the Faraday-cage effect, which does not allow uniformity or a perfect distribution, penetration, and flow of the powder, in certain cases causing the absence of coating product, such as for example in the corners or fins typical of electric motors or of heating bodies such as radiators or components of electrical household appliances and steel structural work in general.

Also known are the difficulties in currently available systems of electrostatically charging very fine powder in order to obtain high-quality finishes. It is in fact difficult to get fine-grain powder and nanometric powder to be charged and to maintain the charge prior to impact on the products for a perfect nebulization and homogeneous distribution over the surfaces or products of various nature under the effect of the electrostatic charge.

Also known are the problems in systems for fine-powder or nanometric-powder coating that use as carrier traditional compressed air, which entrains along with it pollutant elements (amongst which particles of hydrocarbons, particles of water, and pollutant dust of various nature) that render difficult perfect distribution, penetration, and flow of the powder over the surfaces.

In spite of all the aforesaid drawbacks, known systems in any case use as carrier fluid for the powder mere compressed air even though it entrains along with it particles of humidity, particles of oil vapours, and volatile particles present in the atmosphere, thus causing the problems referred to above.

PURPOSE OF THE INVENTION

A first purpose of the present invention is thus to propose an apparatus and a method for electrostatic powder coating that will be free from the aforesaid drawbacks of known systems.

SUMMARY OF THE INVENTION

The above and further purposes have been achieved with a method and an apparatus for electrostatic powder coating according to one or more of the annexed claims, which envisages use, as carrier fluid, of a mixture of nitrogen/oxygen/argon obtained continuously, during the coating process, from compressed air that is modified and then used for movement of the fluidized bed, entrainment of powder, nebulization, peristaltic recovery, electrostatic pre-charge with positive or negative ions of the powder starting from the fluidized bed.

In greater detail, the air is "modified" in the sense that, starting from the natural composition of the environmental air referred to above, to implement the invention the latter is almost totally deprived of oxygen and totally freed of other undesirable substances present in the natural composition, thus obtaining a mixture made up exclusively of nitrogen/oxygen/argon in the preferred percentages referred to hereinafter, which also favour a synergistic effect with ionization and heat conditioning of the carrier fluid described hereinafter.

As preferred, but not indispensable, solution for implementing the invention, said mixture is obtained by means of hollow-fibre osmotic separation membranes or by means of carbon molecular sieve (CMS) using the pressure-swing-absorption (PSA) system.

A first advantage of the invention lies in the fact that, using, as carrier, air thus modified enriched in nitrogen/oxygen/argon, the velocity of thrust increases considerably and creates a less turbulent and faster flow, which is less affected by atmospheric agents such as humidity and thus enables a better and more uniform distribution of the product on the surfaces.

A second advantage is represented by the fact that the mixture obtained from air modified in nitrogen/oxygen/argon is substantially anhydrous, and hence free from humidity and particles of hydrocarbons that are at the origin of vesicular pollution of coating products.

A further advantage is represented by the fact that, using the nitrogen/oxygen/argon mixture and with pre-charging, keeping at a suitable temperature both the fluidized bed and the spray guns, it is also possible to diversify two or more outlets kept at different outlet temperatures that can be optimized for different areas of coating of the product and reduce the coating times in any circumstance. This in fact enables a higher velocity of the reciprocator device that moves the guns for supplying the powder in order to obtain greater uniformity and larger thicknesses in shorter times, and major advantages are achieved in saving of the coating powder and higher productivity in particular in robotized systems.

A further advantage is represented by the fact that, since the nitrogen/oxygen/argon mixture has a higher velocity, an impact that enables better adherence of the powder on the products is created, thus achieving a better adhesion/penetration and flow of the powder, there being impressed on the spray fan a perfect nebulization without dispersion of the powder at the ends of the fan, limiting the rebound effect thanks to the possibility of using smaller nozzles mounted on the guns as compared to the use of traditional compressed air.

The above advantage is particularly felt in the case of robotized systems since it reduces the negative effect of the movement of the spray guns.

Yet another advantage is represented by the fact that the use of air modified in nitrogen/oxygen/argon guarantees a perfect homogeneity of the movement in the fluidized bed given that said mixture is itself, anhydrous and consequently optimal entrainment of the powder in the distribution ducts as far as the guns is achieved.

Yet a further advantage of the invention is the possibility of using waste residual powder, pre-treated in previous coating cycles.

Currently, in fact, the residual powder can no longer be used in a percentage that ranges between 15% and 30%, and its recovery leads to considerable saving from an economic and environmental point of view.

According to a further advantageous use of the invention, the nitrogen/oxygen/argon mixture obtained from compressed air that will be used for moving the fluidized bed and entraining the powder and for atomization/nebulization is pre-charged with positive or negative ions upstream of the fluidized bed, or else is made to be statically neutral (namely, in the plasma state, created by annulling the positive and negative charges in a purposely provided de-ionizing chamber) in order to impose a pre-charge on the powder prior to its outlet from the gun by acting on the particles of argon and of residual oxygen present in the mixture used as carrier in order to annul the Faraday-cage effect.

Advantageously, the fact of moving the powder and imposing a pre-charge with positive or negative ions already in the fluidized bed using anhydrous mixtures of nitrogen/oxygen/argon leads to a better nebulization and a distribution with greater uniformity of the thicknesses owing to the combined synergistic effect between pre-charge and final charge that is exerted by the guns in the nebulization stage.

Yet a further advantage of the invention is the elimination of the above-mentioned problems regarding systems for fine-powder or nanometric-powder coating that use traditional compressed air as carrier.

According to yet a further advantageous use of the invention, the carrier fluid may be heat-conditioned both by heating and by cooling using purposely provided devices, for example, a chiller or other cooling devices, such as with an ultracompact plate heat-exchanger formed by an air-air exchanger equipped with evaporator and a slow-flow separator for example, a demister, with the function of keeping the temperature of the flow at a value of roughly between −15° C. and 45° C., preferably 5°-20° C. throughout the year in order to obtain in any environmental condition a perfect atomization/nebulization of the powder.

In particular, the higher temperatures, close to 45-50° C. or higher, favour the step of drying of the powder-coated products in an oven.

According to a further aspect of the invention, the carrier fluid is heat-conditioned both by heating and by cooling and then mixed to a liquid paint in a spray painting apparatus to keep a desired temperature.

LIST OF DRAWINGS

The above and further advantages will be better understood by any person skilled in the branch from the ensuing description and from the annexed drawings, which are provided merely by way of non-limiting example and in which:

FIG. 1 is a schematic view of a first embodiment of an apparatus according to the invention, with ionization by means of the corona effect;

FIG. 2 is a schematic view of a first embodiment of an apparatus according to the invention, with ionization using the tribo system;

FIG. 3 is a schematic illustration of a plant with peristaltic recovery of the powder from a paint-spray booth; and FIG. 4 is a schematic illustration of a step of separation of gases from the air performed using a hollow-fibre membrane;

FIG. 5 is a schematic view of a spray painting apparatus according to the invention, with ionization and thermal conditioning of a carrier fluid to be mixed with liquid paint.

DETAILED DESCRIPTION

With reference to the drawings, an apparatus and a method according to the invention are now described.

In the example of embodiment illustrated, a source 3 of a fluidifying fluid is provided, which gives out into a container 2 containing an amount of coating powder 4.

The fluid has the function of maintaining in dispersed and non-agglomerated form the powder that is to be sprayed on a substrate to be coated 1.

The container 2 communicates downstream with an atomizer device 18, which in turn communicates with a source 13 of atomization/nebulization fluid and a source 5 of a carrier fluid under pressure, which, via an appropriate pipe 6, is to convey the flow of carrier fluid and atomized powder to a spray nozzle 7 of a gun 17, capable of delivering a coating fan 16.

Moreover provided upstream of the nozzle 7 are means 8, in themselves known, for electrostatically charging the flow of carrier fluid and powder.

In different embodiments, the means 8 may be constituted by an electrode 8 supplied at a high voltage 12 set in the proximity of the nozzle 7 (FIG. 1) or by a tribo tube traversed by the flow of carrier fluid and powder (FIG. 2) in contact with the walls of the tube.

According to the invention, the sources 3, 5 and/or 13 of fluid are sources of a mixture of nitrogen/oxygen/argon made up of nitrogen in a range of 80-98 vol %, oxygen in a range of 1-19 vol %, argon in a range of 1-2 vol %, more preferably nitrogen in a range of 90-96 vol %, oxygen in a range of 3-9 vol %, argon in a range of 1-2 vol %.

Thanks to the invention it has been found (Table 1) that, whereas the velocity of the compressed air at a pressure of 1 bar (as in conventional systems) is of 7.24 m/s with a turbulence of 43.41%, using the mixture of nitrogen and oxygen with 0.9% of argon the velocity increases from 7.24 m/s to 13.17 m/s, reducing the turbulence to 35.79%.

Advantageously, the coating powder, if pushed by a less turbulent and faster carrier fluid, is less affected by atmospheric agents, such as humidity, and thus enables a better and more uniform distribution of the powder over the surface of the substrate 1.

TABLE 1

| | Channel 1 | Channel 2 | Channel 3 |
|---|---|---|---|
| COMPRESSED AIR | | | |
| Velocity Mean (m/sec) | 7.2452 | 0.0000 | 0.0000 |
| Velocity RMS (m/sec) | 3.1451 | 0.0000 | 0.0000 |
| Turbulence Intensity (%) | 43.41 | 0.00 | 0.00 |
| Frequency Mean (MHz) | 5.1257 | 0.0000 | 0.0000 |
| Frequency RMS (MHz) | 0.4886 | 0.0000 | 0.0000 |
| Frequency TI (%) | 9.53 | 0.00 | 0.00 |
| Gate Time Mean (usec) | 10.71 | 0.00 | 0.00 |
| Gate Time RMS (usec) | 10.64 | 0.00 | 0.00 |
| Data Rate (Hz) | 9033 | 0 | 0 |
| Valid Count | 5000 | 0 | 0 |
| Invalid Count | 0 | 0 | 0 |
| Elapsed Time (sec) | 0.8304 | | |
| NITROGEN | | | |
| Velocity Mean (m/sec) | 13.1753 | 0.0000 | 0.0000 |
| Velocity RMS (m/sec) | 4.7149 | 0.0000 | 0.0000 |
| Turbulence Intensity (%) | 35.79 | 0.00 | 0.00 |
| Frequency Mean (MHz) | 6.0470 | 0.0000 | 0.0000 |
| Frequency RMS (MHz) | 0.7325 | 0.0000 | 0.0000 |
| Frequency TI (%) | 12.11 | 0.00 | 0.00 |
| Gate Time Mean (usec) | 6.08 | 0.00 | 0.00 |
| Gate Time RMS (usec) | 4.58 | 0.00 | 0.00 |
| Data Rate (Hz) | 5530 | 0 | 0 |
| Valid Count | 5000 | 0 | 0 |
| Invalid Count | 0 | 0 | 0 |
| Elapsed Time (sec) | 1.3566 | | |

According to a further advantageous aspect of the invention, the source 3 of fluidifying fluid is a source of a mixture as described above, which enables, thanks to the anhydrous nature of nitrogen, a better fluidity of the powder in the container to be obtained, preventing the presence of humidity and the formation of agglomerates.

As further characteristic of the invention, the apparatus moreover comprises means 11 set upstream of said container 2 for electrostatically charging said flow of fluidifying fluid, constituted preferably by the mixture described above, prior to its entry into the container.

Advantageously, this solution enables an increase in the pre-charge of positive or negative ions of the powder in a simple way and without the use of ionization systems integrated in the fluidized bed.

In addition to improving the conditions of the fluidized bed, the pre-charge advantageously enables an increase in the electrostatic charge of the flow of mixture and powder prior to its outlet from the spray nozzle and hence elimination or considerable limitation of the Faraday-cage effect for coating points that are difficult to access, such as corners or recesses in metal bodies. According to a further characteristic of the invention, there is envisaged the use of one or more heat conditioners 10, 19 set preferably upstream of the container 2 and/or of the gun 17 in order to maintain said mixture and the flow of mixture and atomized powder at a desired temperature, for example a temperature of between −15° C. and 45° C., preferably 5°-20° C. Moreover, according to the invention there is afforded the possibility of conditioning and regulating the temperature of the flow of fluid and atomized powder upstream of the spray guns in order to optimize the temperature according to the environmental conditions and the substrate to be coated. Preferably, regulation of the temperature is obtained by a heating device, for example a reservoir with electrical resistances traversed by the fluid, possibly connected to the guns via a conveying tube 60 equipped with means for heating the fluid, for example electrical resistances of a helical shape for a better heat exchange and time of contact set inside the tube.

Preferably, the working mixture is a mixture of gases obtained from air modified in nitrogen/oxygen/argon produced with hollow-fibre membranes (see diagram of FIG. 4) or with an activated-carbon system referred to as PSA (pressure-swing absorption) at a constant temperature of −15° C. and 45° C., preferably 5°-20°.

With reference to the preferred embodiments illustrated in the attached drawings, operation of the apparatus according to the invention envisages supplying a working fluid constituted by the mixture described above in the container 2, into which an amount of coating powder 3 has been introduced.

Introduction of the mixture, which is electrostatically pre-charged, determines formation of a fluidized bed constituted by powder and mixture.

Inserted in the container 2 is a tube 14, which at the other end communicates with an atomizer 18. Extracted through the tube is a flow made up of working fluid and powder recalled into the atomizer by the mixture entering the atomizer from the source 5 and exiting towards the gun 17 through the pipe 6.

From the container there is moreover provided a discharge outlet 15 for the mixture and the residual powder.

In the case of FIG. 1, also giving out into the atomizer 18 is the source 13, which carries a pressurized flow of mixture that is designed to guarantee proper entrainment of the powder to the gun.

Once again in the case of FIG. 1, provided in the proximity of the spray nozzle 7 is an electrode 8 supplied by a high-voltage generator for electrostatically charging the outgoing flow of mixture and powder.

At the same time, the substrate 1 to be coated is kept at a neutral voltage (earthed) in such a way that the flow of mixture and atomized powder impinges upon it and forms the coating layer.

Preferably, the mixture entering the container and/or the flow of mixture and powder reaching the gun 17 are thermally conditioned to maintain a temperature of between −15° C. and 45° C. irrespective of the conditions of external temperature and the period of the year.

Figure 2:
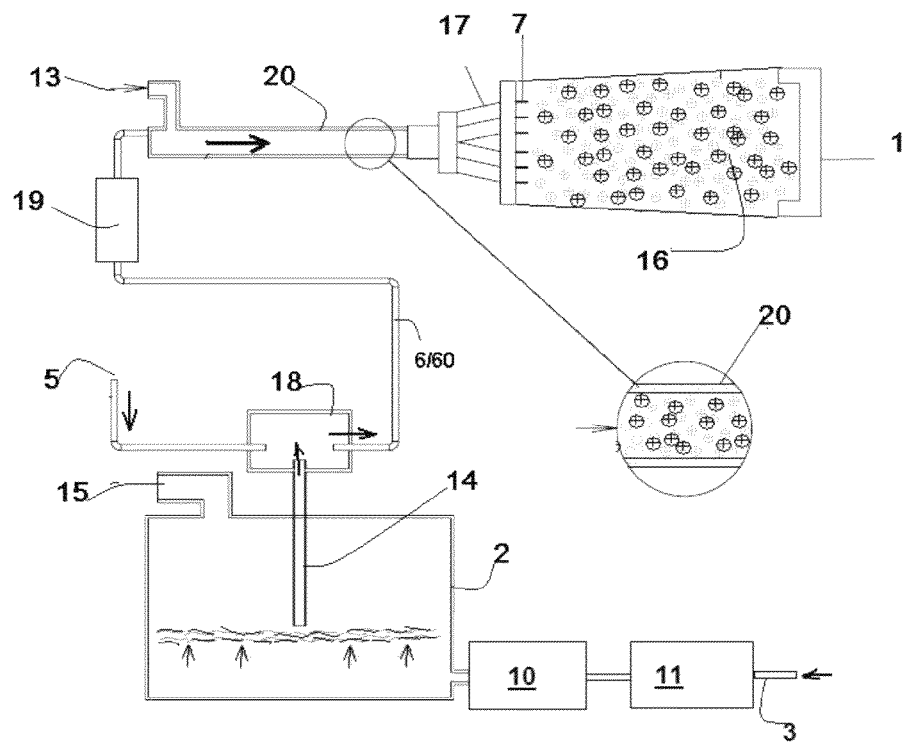
Figure 3:
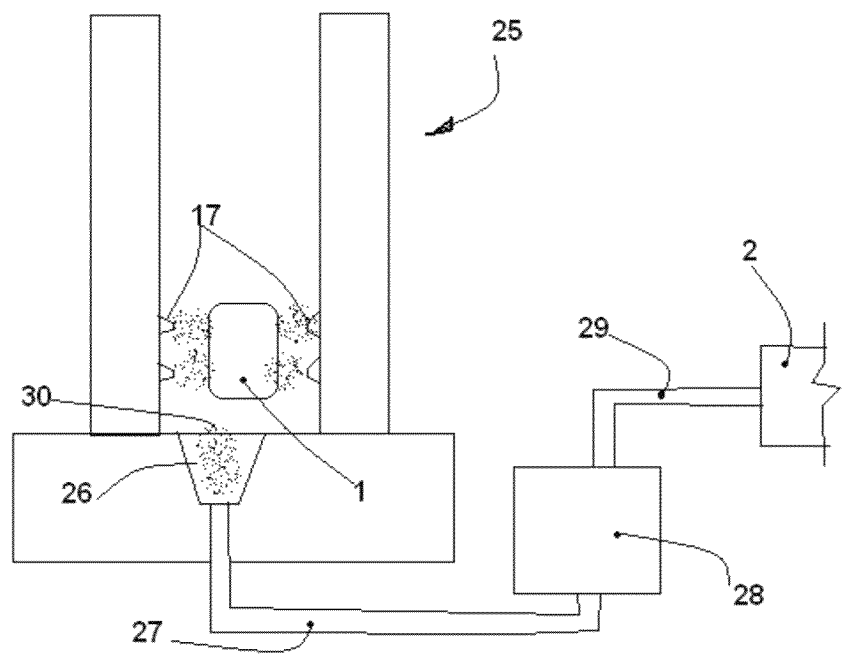
Figure 4:
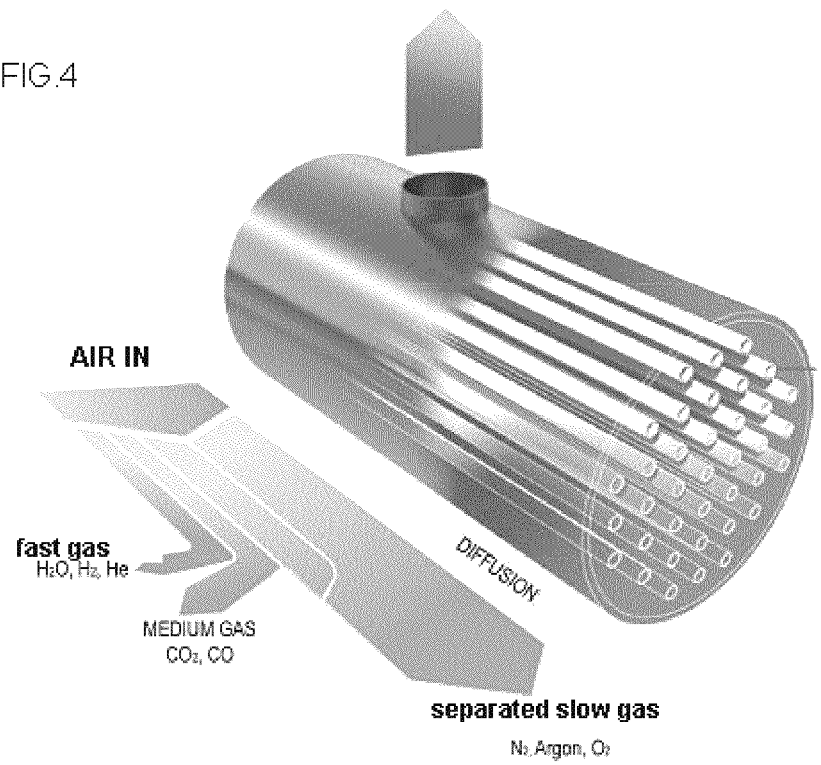
Figure 5:
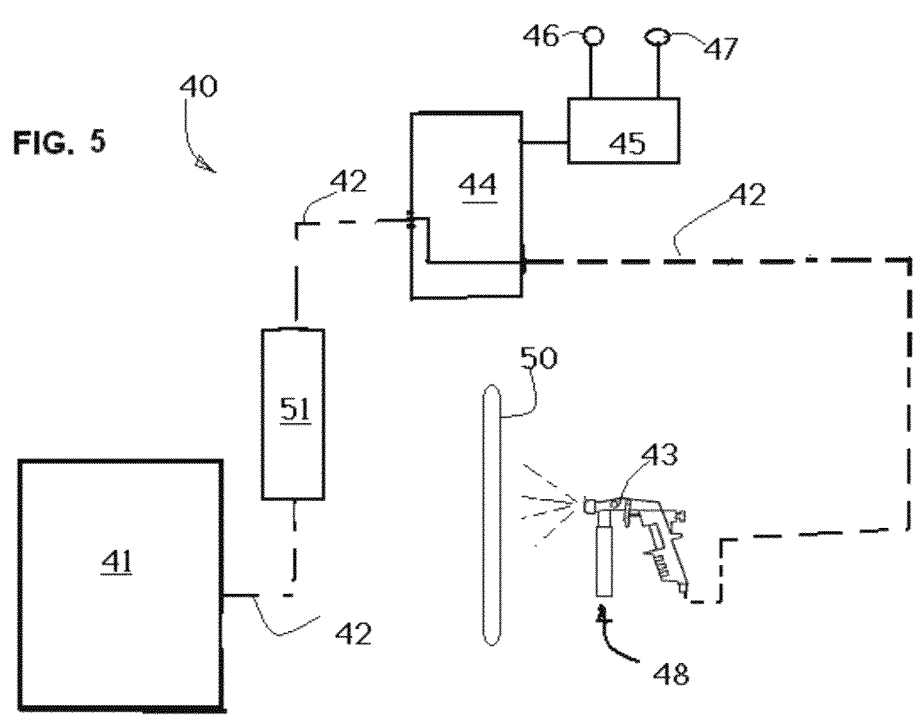

Illustrated in FIG. 2 is an apparatus with an operation similar to the one just described, but in which the flow of carrier mixture is delivered by the source 13 upstream of a tribo tube 20, of a type in itself known, in which both the carrier mixture and the flow of mixture and atomized powder converge in such a way as to be charged positively by contact prior to being sent on to the substrate 1 by the spray nozzles 7.

The invention thus achieves the important advantages listed below.

A. Since the mixture described above, obtained from air modified in nitrogen/oxygen/argon is anhydrous, it is thus free from humidity and particles of hydrocarbons that lie at the origin of vesicular pollution of coating products, with a velocity of 13.17 m/s.

B. Since the carrier fluid is heat-conditioned via purposely designed heating and/or cooling equipment, it achieves the purpose of obtaining a perfect atomization/nebulization of the powder and ensuring a constant temperature throughout the year, for example by means of a chiller capable of maintaining the temperature of the fluidized bed at a value of between −15° C. and 45° C.

C. The mixture of nitrogen/oxygen/argon obtained from compressed air that is used for moving the fluidized bed in the container and/or entrainment of the powder and atomization/nebulization thereof is pre-charged with positive or negative ions in order to impose a pre-charge on the powder prior to exit thereof from the nozzle of the spray gun. The electrostatic pre-charge, by acting on the particles of argon and residual oxygen present in the carrier mixture eliminates the Faraday-cage effect described above;

D. The nitrogen/oxygen/argon mixture is faster than the compressed air used conventionally and creates an impact of the powder that thus adheres better to the products, creating a better adhesion and flow of the powder, impressing on the spray fan a perfect nebulization without any dispersion of the powder at the ends of the fan as a result of the movement of the guns, as occurs for example in robotized systems.

E. The use of air modified in nitrogen/oxygen/argon guarantees a perfect homogeneity of nebulization in the fluidized bed given that the mixture is anhydrous, and also perfect entrainment thereof in the tubes for distribution to the guns.

F. The nitrogen/oxygen/argon jet eliminates the relative humidity present in the products, which prevents perfect adhesion of the powder and creation of microbubbles.

G. The use of the nitrogen/oxygen/argon mixture eliminates any problem regarding formation of masses or aggregates of powder in the fluidized bed, given that the latter is anhydrous, i.e., free from humidity.

Advantageously, according to the invention it may moreover be envisaged that the flow of the working mixture is distributed for use via tubes coated with conductive polytetrafluoroethylene (PTFE) with glass-fibre filler, for example the material marketed under the trade name Teflon®, in so far as with said solution the ions that are conveyed within the tube are not dispersed.

Teflon consequently eliminates the problem of dispersion of the ions of the carrier mixture along the path within the tube.

Described schematically with reference to FIG. 3 is a plant for coating a substrate 1 in a paint-spray booth 25, where the powder 4 emitted by the guns 17 is gathered by a hopper 26 set underneath the grill 30 of the plane of coating and is carried, via a first duct, to an accumulation container 28 and, via a second duct 29, to a fluidized-bed container 2 according to the invention. Advantageously, thanks to the invention, the powder 4 gathered by the hopper is carried by an electrostatically charged mixture of nitrogen/oxygen/argon, which reduces the formation of agglomerates and improves the efficiency of the recovery of the powder.

FIG. 5 schematically shows a spray painting apparatus 40 according to a further aspect of the invention to paint a support 50.

Apparatus 40 comprises a source 41 of a pressurized carrier fluid capable of being ionized. Preferably the carrier fluid is a gas mixture made up of nitrogen in a range of 80-99.9%, preferably 80-98%, oxygen in a range of 1-19 vol %, argon in a range of 1-2%.

The carrier fluid is sent through conduits 42 to a spray gun 43 to be mixed with a liquid paint contained in a reservoir 48 and to form a painting mixture to be sent onto the support 50.

Before reaching the spray gun, the carrier fluid is heat conditioned by a thermal conditioning device 44 able to both heat and cool the carrier fluid to maintain a painting temperature between −15° C. and +45° C., preferably between 5° C. and 20° C., irrespective of the environment temperature conditions.

Preferably the heating means of device 44 comprise electric resistance devices and the cooling means comprise a chiller or other cooling devices, such as with an ultracompact plate heat-exchanger formed by an air-air exchanger equipped with evaporator and a slow-flow separator for example, a demister.

The thermoconditioning device 44 is controlled by a control unit 45. Temperature sensors 46, 47 may further be provided to sense the temperature of the carrier fluid and/or of the environment and to adjust in response the heating and/or cooling of the carrier fluid to reach and to maintain the desired painting temperature.

The apparatus 40 further comprises a ionization unit 51 for ionization of the carrier fluid with positive and/or negative ions according to the desired final charge, whether positive, negative or neutral, or in the plasma state, also in relation of the static nature of the support 50, by example whether support 50 is made of a metallic or plastic material.

The present invention has been described according to preferred embodiments, but equivalent variants may be devised, without thereby departing from the sphere of protection of the invention.

The invention claimed is:

1. A method for electrostatic coating of a substrate (1), comprising the steps of:

supplying a working fluid at between 0.5 bar and 10 bar in a container (2) containing an amount of coating powder (3);

extracting from said container (2) a first flow made up of working fluid and powder;

atomizing said flow of working fluid and powder with a jet of working fluid at a pressure of between 0.5 bar and 10 bar;

supplying working fluid at a pressure of between 0.5 bar and 10 bar to create a second transport flow made up of working fluid and atomized powder;

charging said second flow of working fluid and atomized powder electrostatically under pressure; and sending said second flow of working fluid and atomized electrostatically charged powder onto a substrate (1), said method being characterized in that:

said working fluid is a mixture made up of nitrogen in a range of 80-98%, oxygen in a range of 1-19%, argon in a range of 1-2%, wherein oxygen and argon together are in a range of 2-20%;

said mixture is obtained continuously during coating by taking environmental air and depriving it of residual substances not comprised in a natural composition of the environmental air; and said mixture is electrostatically pre-charged upstream of entry into said container with positive and/or negative ions according to the desired final electrostatic charge.

2. The method according to claim 1, wherein said flow of the working fluid that is to be introduced into the container (2) is thermally conditioned, in an adjustable way, to maintain a temperature of between −15° C. and +45° C.

3. The method according to claim 1, comprising a step of regulation of the temperature of the flow of the working fluid and powder, prior to the working fluid and powder being sent onto said substrate.

4. The method according to claim 1, wherein said mixture is a mixture of gases obtained from air modified in nitrogen/oxygen/argon produced with hollow-fibre membranes or PSA system.

5. The method according to claim 1, comprising a step of peristaltic recovery of the powder from a spray booth (25) to the container (2).

6. The method according to claim 1, using an apparatus for electrostatic coating of substrates (1), comprising:

a container (2) containing coating powder (4) supplied by a source (3) of a working fluid;

an atomizer (18) communicating with said container and with at least one source (5) of working fluid under pressure;

a source (13) of a working fluid under pressure for conveying along a pipe (6) a flow of working fluid and atomized powder to at least one spray device (17) provided with at least one spray nozzle (7); and means (8) for electrostatically charging said flow of working fluid and powder, set between said container (2) and said spray nozzle (7), said apparatus being characterized in that said sources (3, 5, 13) of working fluid are sources of modified air comprising nitrogen in a range of 80-99.9%, oxygen in a range of 1-19%, and argon in a range of 0.9-2%, and comprising means (11) for electrostatically charging said flow of mixture upstream of said container (2) with positive and/or negative ions according to the desired final charge, whether positive, negative or neutral, or in the plasma state.

7. The method according to claim 6, wherein said sources (3, 5, 13) of said mixture comprise hollow-fibre membrane devices for separating air modified in nitrogen/oxygen/argon starting from compressed air.

8. The method according to claim 6, wherein said sources (3, 5, 13) of said mixture comprise molecular-sieve devices using the pressure swing-absorption (PSA) system for separating air modified in nitrogen/oxygen/argon starting from compressed air.

9. The method according to claim 6, comprising heat-conditioning means (19) provided with a chiller and/or heating means, set upstream of said nozzle (7) in order to maintain said flow of mixture and atomized powder at a temperature of between −15° C. and +45° C. and optimize the temperature according to the environmental conditions and the substrate to be coated.

10. The method according to claim 6, comprising a heat-conditioning device (10) provided with a chiller set upstream of the container (2) in order to maintain said flow of mixture at a temperature of between −15° C. and +45° C., preferably between 5° C. and 20° C.

11. The method according to claim 6, wherein said mixture is distributed via tubes coated with conductive polytetrafluoroethylene with glass-fibre filler in order to eliminate dispersion of the ions along the path within the tube.

12. The method according to claim 6, comprising means for peristaltic recovery of the powder (4).

13. An apparatus for electrostatic coating of substrates (1), comprising:

a container (2) containing coating powder (4) supplied by a source (3) of a working fluid;

an atomizer (18) communicating with said container and with at least one source (5) of working fluid under pressure;

a source (13) of a working fluid under pressure for conveying along a pipe (6) a flow of working fluid and atomized powder to at least one spray device (17) provided with at least one spray nozzle (7); and means (8) for electrostatically charging said flow of working fluid and powder, set between said container (2) and said spray nozzle (7), said apparatus being characterized in that said sources (3, 5, 13) of working fluid are sources of modified air comprising nitrogen in a range of 80-99.9%, oxygen in a range of 1-19%, and argon in a range of 0.9-2%, and comprising means (11) for electrostatically charging said flow of working fluid upstream of said container (2) with positive and/or negative ions according to the desired final charge, whether positive, negative or neutral, or in the plasma state, wherein said apparatus is operated to electrostatic coating of a substrate (1), by:

supplying a working fluid at between 0.5 bar and 10 bar in the container (2) containing the coating powder (3);

extracting from said container (2) a first flow made up of working fluid and powder;

atomizing said flow of working fluid and powder with a jet of working fluid at a pressure of between 0.5 bar and 10 bar;

supplying working fluid at a pressure of between 0.5 bar and 10 bar to create a second transport flow made up of working fluid and atomized powder;

charging said second flow of working fluid and atomized powder electrostatically under pressure; and sending said second flow of working fluid and atomized electrostatically charged powder onto a substrate (1), wherein, said working fluid is a mixture made up of nitrogen in a range of 80-98%, oxygen in a range of 1-19%, argon in a range of 1-2%, wherein oxygen and argon together are in a range of 2-20%;

said mixture is obtained continuously during coating by taking environmental air and depriving it of residual substances not comprised in a natural composition of the environmental air; and said working fluid is electrostatically pre-charged upstream of entry into said container with positive and/or negative ions according to the desired final electrostatic charge.

14. The apparatus according to claim 13, wherein said sources (3, 5, 13) of said working fluid comprise hollow-fibre membrane devices for separating air modified in nitrogen/oxygen/argon starting from compressed air.

15. The apparatus according to claim 13, wherein said sources (3, 5, 13) of said working fluid comprise molecular-sieve devices for separating air modified in nitrogen/oxygen/argon starting from compressed air.

16. The apparatus according to claim 13, comprising heat-conditioning means (19) provided with a chiller and/or heating means, set upstream of said nozzle (7) in order to maintain said flow of mixture and atomized powder at a temperature of between −15° C. and +45° C. and optimize the temperature according to environmental conditions and the substrate to be coated.

17. The apparatus according to claim 13, comprising a heat-conditioning device (10) provided with a chiller set upstream of the container (2) in order to maintain said flow of working fluid at a temperature of between −15° C. and +45° C., preferably between 5° C. and 20° C.

18. The apparatus according to claim 13, wherein said working fluid is distributed via tubes coated with conductive polytetrafluoroethylene with glass-fibre filler in order to eliminate dispersion of the ions along the path within the tube.

19. The apparatus according to claim 13, comprising means for peristaltic recovery of the powder (4).

20. The method according to claim 1, wherein said flow of the working fluid that is to be introduced into the container (2) is thermally conditioned to maintain a temperature of between 5° C. and 20° C.

* * * * *